(12) United States Patent
Stehle et al.

(10) Patent No.: US 12,201,926 B2
(45) Date of Patent: Jan. 21, 2025

(54) FILTER DEVICE

(71) Applicant: HYDAC FILTERTECHNIK GMBH, Sulzbach/Saar (DE)

(72) Inventors: Gerhard Stehle, Constance (DE); Michael Sakraschinsky, St. Ingbert (DE); Florentin Van Uffelen, Kressbronn a.B. (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 423 days.

(21) Appl. No.: 17/640,883

(22) PCT Filed: Sep. 1, 2020

(86) PCT No.: PCT/EP2020/074308
§ 371 (c)(1),
(2) Date: Mar. 7, 2022

(87) PCT Pub. No.: WO2021/047945
PCT Pub. Date: Mar. 18, 2021

(65) Prior Publication Data
US 2022/0331719 A1    Oct. 20, 2022

(30) Foreign Application Priority Data
Sep. 9, 2019    (DE) .................. 10 2019 006 455.0

(51) Int. Cl.
*B01D 29/96*    (2006.01)
*B01D 29/23*    (2006.01)
(Continued)

(52) U.S. Cl.
CPC ............. *B01D 29/96* (2013.01); *B01D 29/23* (2013.01); *B01D 35/0276* (2013.01);
(Continued)

(58) Field of Classification Search
CPC ........ B01D 29/96; B01D 29/23; B01D 35/14; C01F 1/46; C02F 1/32
See application file for complete search history.

(56) References Cited

U.S. PATENT DOCUMENTS 7,143,897 B1    12/2006 Guzman et al.
2009/0200223 A1    8/2009 Baumgaertner et al.
(Continued)

FOREIGN PATENT DOCUMENTS

DE              701239         1/1941
DE      10 2014 002 241        8/2015
(Continued)

OTHER PUBLICATIONS

DE-102015002900-A1—Translation (Year: 2015).*
(Continued)

*Primary Examiner* — Walter D. Griffin
*Assistant Examiner* — Cameron J Allen
(74) *Attorney, Agent, or Firm* — Wenderoth, Lind & Ponack, L.L.P.

(57) ABSTRACT

A filter device has a filter housing (14), in which a replaceable filter element (18) is accommodated, and has a filter head (26) for securing the filter housing (14) to a third component, such as a tank wall (10) of a storage tank. The filter housing (14) is mounted on the filter head (26) in an articulated manner by a bearing (28) providing more than one degree of freedom.

12 Claims, 7 Drawing Sheets

(51) Int. Cl.
 *B01D 35/027* (2006.01)
 *B01D 35/147* (2006.01)
(52) U.S. Cl.
 CPC ...... *B01D 35/147* (2013.01); *B01D 2201/291* (2013.01); *B01D 2201/305* (2013.01); *B01D 2201/4076* (2013.01)

(56) References Cited

U.S. PATENT DOCUMENTS

2015/0231539 A1* 8/2015 Hasenfratz ........... B01D 35/005
 210/236
2018/0043290 A1 2/2018 Bautz et al.

FOREIGN PATENT DOCUMENTS

| | | |
|---|---|---|
| DE | 10 2015 002 900 | 9/2016 |
| DE | 102015002900 A1 * | 9/2016 |
| DE | 10 2015 007 691 | 12/2016 |
| DE | 10 2017 007 445 | 2/2019 |
| DE | 10 2019 005 323 | 1/2021 |
| EP | 2 092 970 | 8/2009 |
| WO | 02/076570 | 10/2002 |
| WO | 2020/104260 | 5/2020 |

OTHER PUBLICATIONS

DE 701239 C claims translation (Year: 1937).*
International Search Report (ISR) issued Nov. 5, 2020 in International (PCT) Application No. PCT/EP2020/074308.

* cited by examiner

FILTER DEVICE

FIELD OF THE INVENTION

The invention relates to a filter device having a filter housing, in which a replaceable filter element is accommodated, and having a filter head for securing the filter housing to a third component, such as a tank wall of a storage tank.

SUMMARY OF THE INVENTION

Filter devices of this type are state of the art (DE 10 2015 007 691 A1). The space-saving installation in a hydraulic tank renders such filter devices suitable for use in compact hydraulically driven equipment where there is little available installation space. In-tank installation also makes for a simple design of the filter housing, which is formed from a relatively thin-walled discharge pipe extending from the filter head at a radial distance from the filter element, as a rule formed from a type of cover into the interior of the tank to a position lower than the operational fluid level in the fluid tank or storage tank.

In practice, it can happen that the element receiving in the form of the filter housing, which holds the actual filter element, and a wall provided for the element receiving with a receiving opening on the third component, such as the inlet port of the tank, have an angular offset relative to each other. The angular offset makes it difficult or even impossible to secure the filter device to the third component.

SUMMARY OF THE INVENTION

Based on this prior art, the invention is therefore based on the task of providing a filter device that is used to compensate for manufacturing tolerances on the third component, such as a tank.

According to the invention, this problem is basically solved by a filter device having, as an essential feature of the invention, the filter housing, preferably together with the replaceable filter element, in the operating state being mounted on the filter head in an articulated manner by a bearing providing more than one degree of freedom. In this way, any manufacturing tolerances on a third-party component, such as a fluid storage tank and its housing, can be compensated. Any angular offset between the filter housing as the element receiving and an assignable wall having the receiving opening on the third component, for instance in the form of the inlet connection of a fluid storage tank, can be easily compensated for in such a way that the filter housing is mounted on the filter head to be swiveled in almost any installation direction relative to the filter head secured on the third component. In particular, a compensation option for possible misalignment errors is created, such that a reduction of the tolerance limits for the manufacture of the third-party component, which otherwise have to be closely observed, is rendered possible. In particular, filter devices having filter elements that extend far in the axial direction and having the assigned assembled filter housings, can in that way be operationally reliable and with favorable manufacturing costs producible be secured on such third-party components, which regularly have correspondingly housing walls, to which the filter devices are to be secured.

Advantageously, the arrangement is such that for forming the bearing, the filter head is formed of two head parts, one of which is stationarily secured to the third component and the other head part is swivel mounted in relation thereto. The respective degree of freedom, in which the swivel head part can be positioned relative to the stationary head part, also applies to the positioning of the element receiving in the form of the filter housing, which is connected to the swiveling head part, relative to the stationary head part in predefinable angular positions to be able to compensate for manufacturing tolerances, in particular on the third component. In particular, a vertical installation position of the filter housing is preferred for the thus angular adjustment to achieve undisturbed particle filtration using the filter element.

In a further preferred embodiment, for forming the bearing provision is made for the swiveling head part, which is connected to the filter housing, to have a convexly extending bearing surface, which is guided in a concavely extending bearing surface of the stationary head part, and for the respective bearing surface to be part of a shell. Owing to the shell-shaped structure, a kind of ball-and-socket joint is achieved for swiveling the one head part having the element receiving relative to the other stationary head part.

A shell in terms of the invention and as defined in engineering mechanics is a planar supporting structure that has a spatially doubly curved shape and that, in particular, can bear forces both perpendicularly and in its respective plane of curvature itself.

Furthermore, the shell bearing according to the invention can be designed to be compact, such that the filter device according to the invention requires only a small amount of installation space on the assigned third-party components, such as a fluid storage tank. Furthermore, the angular adjustment device ensures reliable installation even for long filter housings and filter elements.

In a further advantageous embodiment of the filter device according to the invention, provision is made for the stationary bearing shell to radially encompass the swivel bearing shell received therein. By a locking device, preferably having the form of a tongue-and-groove system, the shells are secured against counter-rotation in the assembled state by form fit.

Because a rotational motion of these components relative to the filter head is required for the assembly and disassembly of the filter housing having the filter element, the aforementioned form fit allows this, because then the swiveling head part cannot unintentionally rotate counter to the stationary head part. Instead, the swiveling head part remains in its radial installation position with respect to the stationary head part and is secured against rotation with respect to the stationary head part by the form fit, permitting the element receiving to be disconnected from and reconnected to the head part still held in a swiveling manner without obstruction.

In a further preferred embodiment of the filter device according to the invention, provision is made, viewed in the coaxial direction with respect to the longitudinal axis of the non-swivel filter housing, for the swivel head part to have a dome, which is guided in a dome receiving in the stationary head part. The dome can be a curved surface of a spherical section or can be designed as a kind of flat dome. The dome bearing referred to here is used to bear axial forces as viewed in the direction of the longitudinal axis of the non-swiveled filter housing, such that the radial contact surfaces of the individual shells of the shell bearing cannot become "wedged" together. The swivel bearing referred to then remains functional even if axial forces occur, as they can regularly occur in filtration operation. In certain applications in filtration technology, the shell support in the radial and axial directions also permits the angular position of the filter housing relative to the filter head to be adjusted during operation.

It has proved to be particularly advantageous to select the curvatures of the shells and the curvatures of the dome and dome receiving in such a way that, for a predeterminable angular offset of the filter housing, the assigned bearing surfaces, in contact with each other, can slide along each other without interference. It has proved to be particularly advantageous to form the curvatures of all curved surfaces in contact with each other, to be identical and, in particular, to provide them with a spherical shape.

In a further preferred embodiment of the filter device according to the invention, provision is made for, in extension of the dome, viewed in the direction of the filter housing, in the swiveling head part a bypass valve to be provided. The closing part of the bypass valve closes the opening of an adjacently arranged end cap of the filter element in the unactuated state. This arrangement in conjunction with the angle compensation option can be used to ensure that the filter housing or the element receiving is always at right angles to the bypass sealing cone. Only in this way, the tightness of the bypass valve as a whole is guaranteed. Particularly in the event of the filter element material being blocked because of particle contamination, the flow of unfiltered matter can be guided to the clean side of the filter device via the bypass valve and brought to the fluid side of the fluid storage tank without impairing the functional sequence for a connected hydraulic circuit.

Preferably, provision is further made for the filter head to have the form of a flanged cover or threaded cover. Locating screws can be used to secure the flanged cover from the outside to a tank wall of the storage tank. The threaded cover can be screwed-in via a threaded section of a matching insert flange on the storage tank, so that the filter device according to the invention can be adapted to a large number of installation variants on third-party components.

In a further preferred embodiment of the filter device according to the invention, provision is made for the filter housing to form a structural unit with the filter element. The structural unit has a locating device, which, in a basic position, can be inserted axially into a mounting device of the swiveling head part. After a rotational motion has been performed starting from this basic position, the locating device is latched to the mounting device in a latched position in a releasable manner using latching means. The latching means, which are effective in the latched position, secure the locating device and receiving device together in the rotational position of form fit contact of the assigned contact surfaces with each other, such that even when the device is in operation, the element receiving does not separate unintentionally from the filter head.

In a further preferred embodiment of the filter device according to the invention, provision is made for the filter housing to encompass the filter element at a radial distance and to be provided with housing openings for the passage of fluid. The interior of the filter element, which is encompassed by a filter element material, is connected to the environment, preferably in the form of a tank interior, via an opening at the end cap of the filter element opposite to the bypass valve in a fluid-conveying manner. In this way, a filter device for installation in a fluid storage tank can be conceived as a return filter. The housing openings can be used to remove air in the fluid from the fluid.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are in general view and are not to scale.

DETAILED DESCRIPTION OF THE INVENTION

Figure 1:
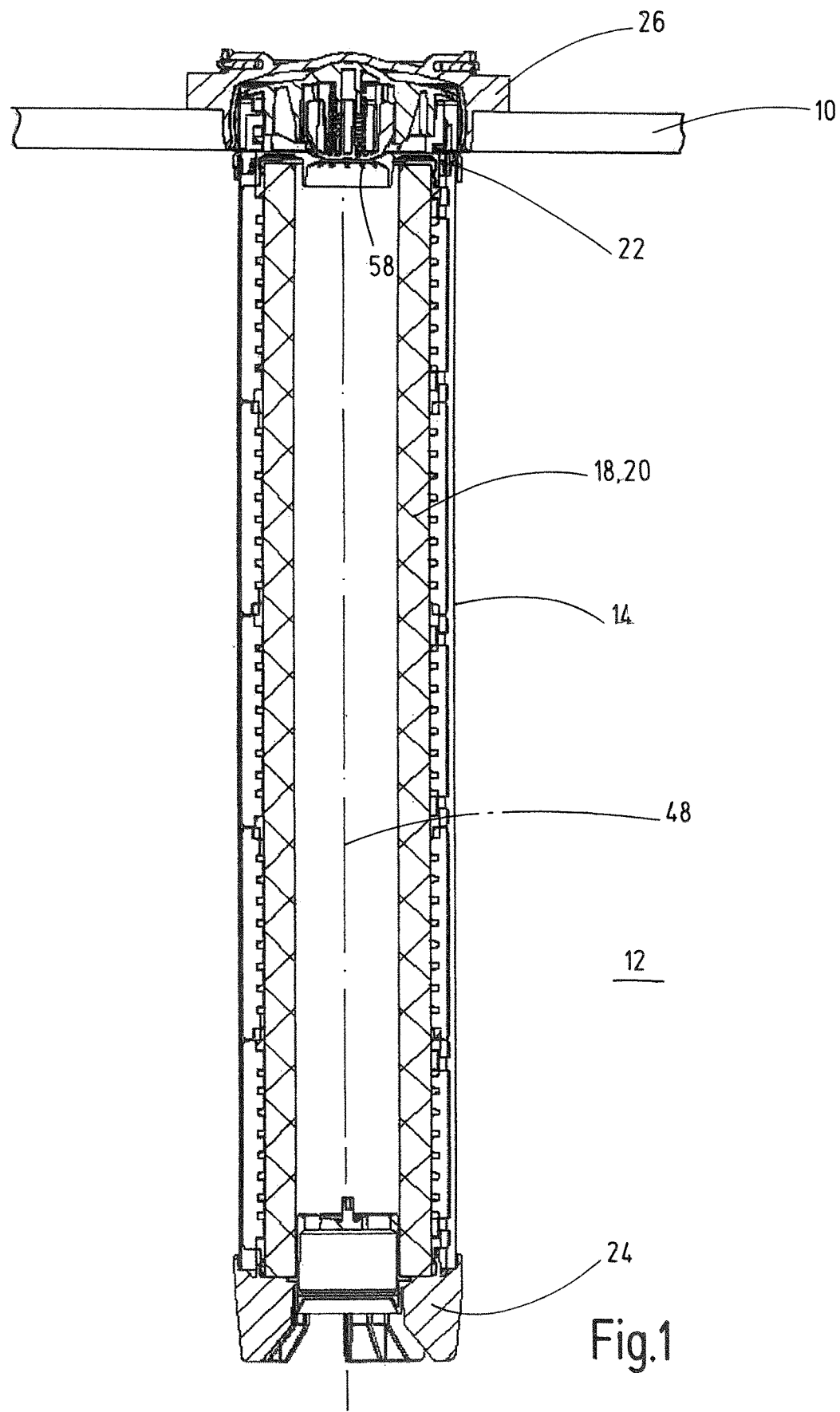
FIG. 1 is a side view in section of a filter device according to an exemplary embodiment of the invention in the installed state on a tank wall of a fluid storage tank (not shown in more detail)

With reference to the individual figures, the filter device according to the invention is explained using the example of a filter, in particular a return flow filter, intended for the installation in a tank (not shown). The upper tank wall 10 and the interior of this tank 12 are shown, which is to be used as a fluid supply tank for a hydraulic supply circuit (not shown). The filter device has a filter housing 14, which is provided with fluid passage points 16 (see FIG. 3). A replaceable filter element 18, the element material 20 of which extends between an upper cap 22 and a lower end cap 24, is accommodated within the filter housing 14. The filter housing 14, which serves as an outflow pipe, has the form of a thin-walled hollow cylinder and encompasses the element material 20 of the filter element 18 at a predeterminable radial spacing.

Figure 2:
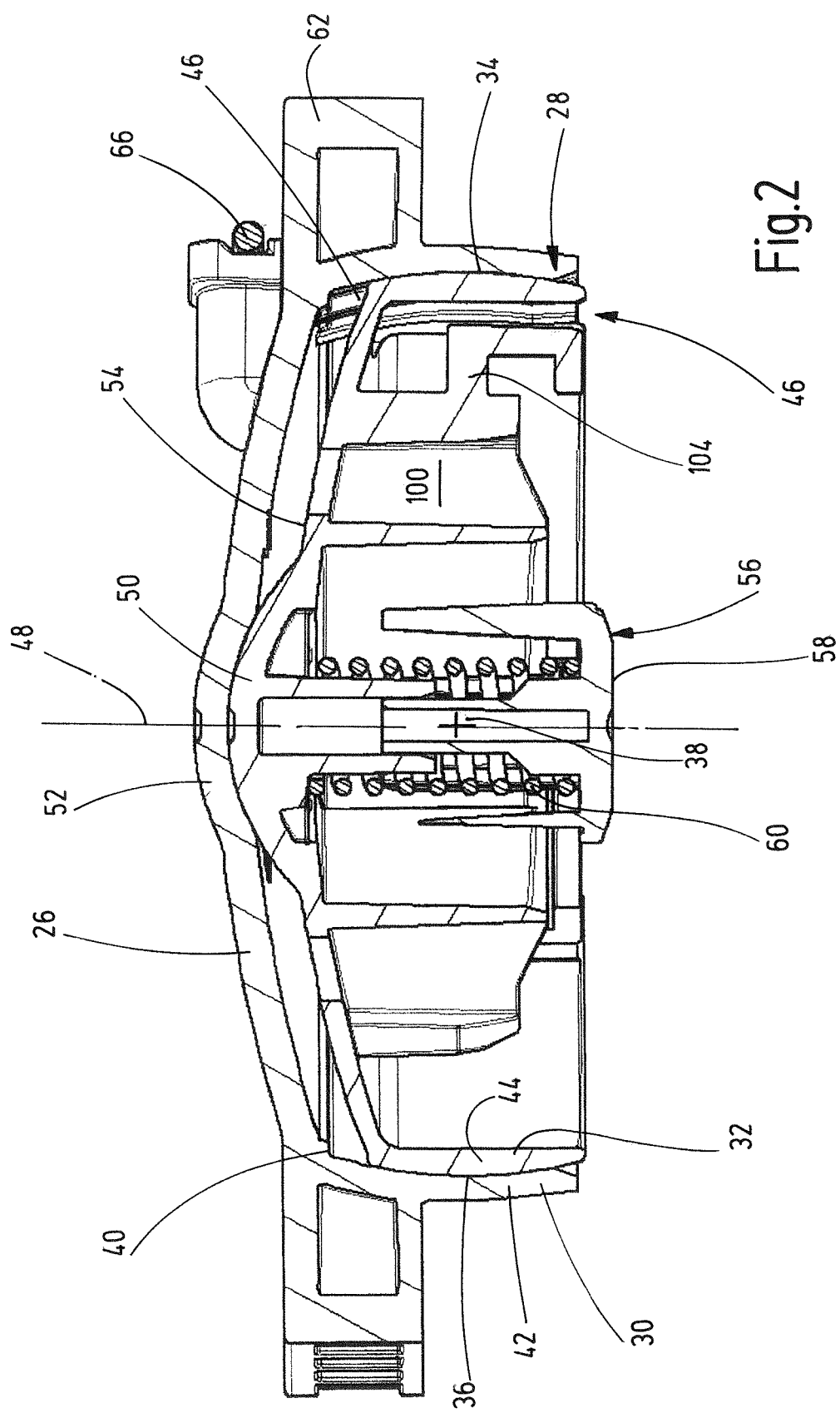
FIG. 2 is a side view in section of the filter head secured to the wall in FIG. 1.

The filter housing 14 is detachably attached to a filter head 26, as shown enlarged in a sectional view in FIG. 2. The filter head 26 shown in FIG. 2 permits to swivel mount the filter housing 14 in an articulated manner by a bearing 28 providing more than one degree of freedom. To form the bearing 28, the filter head 26 has two head parts 30, 32, of which one or a first head part 30 is secured in a stationary manner to the third component in the form of the tank wall 10 and the other or a second head part 32, in contrast, is swivel mounted in the stationary head part 30. For this purpose, the swiveling head part 32 has a convexly extending bearing surface 34 at the circumference. The bearing surface 34 is guided in a correspondingly extending concave bearing surface 36 of the stationary head part 30. The bearing surface 36 referred to as stationary, is also continuously arranged on the inside of the stationary head part 30 as a circumferential surface. In the present exemplary embodiment, the stationary bearing surface 36, viewed in the axial direction, extends over the moving convex bearing surface 34 such that during a swivel motion for the purpose of compensating for an angular offset about the swivel axis 38 perpendicular to the image plane or to the axis 48 that forms an axis of symmetry for the concave bearing surface 36, the bearing surfaces 34, 36 being sections of spheres and remaining in engagement with each other in any case. Viewed in the direction of FIG. 2, a circumferential limit for the swivel motion is provided as a stop surface 40 on the inside of the stationary head part 30. In this way, the two head parts 30, 32 create a kind of ball joint with a predefinable swivel motion for the inner head part 32.

The bearing surfaces 34 and 36 are each part of a shell or shell body 42 and 44, respectively. Preferably, the two head parts 30, 32 are made of a plastic material, such as PA (6) or PA (66). The two head parts 30, 32 are each integrally obtained from the respective plastic materials, preferably by injection molding. However, it is also possible to manufacture the shells from individual segments and join them in a vertical design (not shown) by bonding or welding. The stationary arranged bearing shell 42 radially encompasses the swivel bearing shell 44, wherein by a locking device 46, preferably in the form of a tongue-and-groove system, the shells 42, 44 are secured against radial counter rotation in the assembled state by form fit.

Furthermore, in the coaxial direction to the longitudinal axis 48 of the filter device in the non-swiveled state, the swiveling head part 32 has a dome 50 on its top face, which is guided in a dome receiving 52 in the stationary head part 30 without spacing. The dome 50, formed as a curved surface of a spherical section or as a flat dome, opens out at the foot end into the top face 54 of the swivel head part 32. This top face 54, viewed in the direction of FIG. 2, slopes outwards starting from the longitudinal axis 48 and opens out at the edge in the transition to the convex bearing surface 34, wherein the edge formed in this way forms the counterpart for the circumferential stop surface 40. Preferably, the curvatures of the two shells 42 and 44 and the curvatures of the dome 50 and the dome receiving 52 are formed equally, such that the assignable bearing surfaces can slide on each other without inhibition during a swiveling process about the swivel axis 38.

As viewed in the extension of the dome 50 in the direction of the filter housing 14, in the swivel head part a bypass valve 56 is arranged, the plate-shaped closing part 58 of which is held in the closed position under the action of a compression spring 60. Furthermore, the stationary head part 30 has a projecting abutment edge 62, which, when placed on the top side of the tank wall 10 (see FIG. 1), permits the filter head 26 to be secured on the top side of the tank wall 10, wherein locating screws, which are not shown in greater detail, extend through the abutment rim 62 at predeterminable penetration points 64 and in that way permit the screw connections to be secured. Further, hinged to the top side 54 of the stationary head portion 30 is a swivel handling bracket 66, as shown particularly in FIG. 7, which permits to remove the filter device from the third component, particularly in the form of the fluid storage tank. When not in use, the handling bracket 66, shown in FIG. 7 in high position, can be swiveled back to lie flat on the top side 54 of the filter head 26 in the non-use position. As further shown in FIGS. 4, 5, two diametrically opposed insertion slots 68 are provided on the outer circumference of the stationary head portion 30 to help facilitate the latching of the swivel head portion 32 into the stationary head portion 30.

Figure 4:
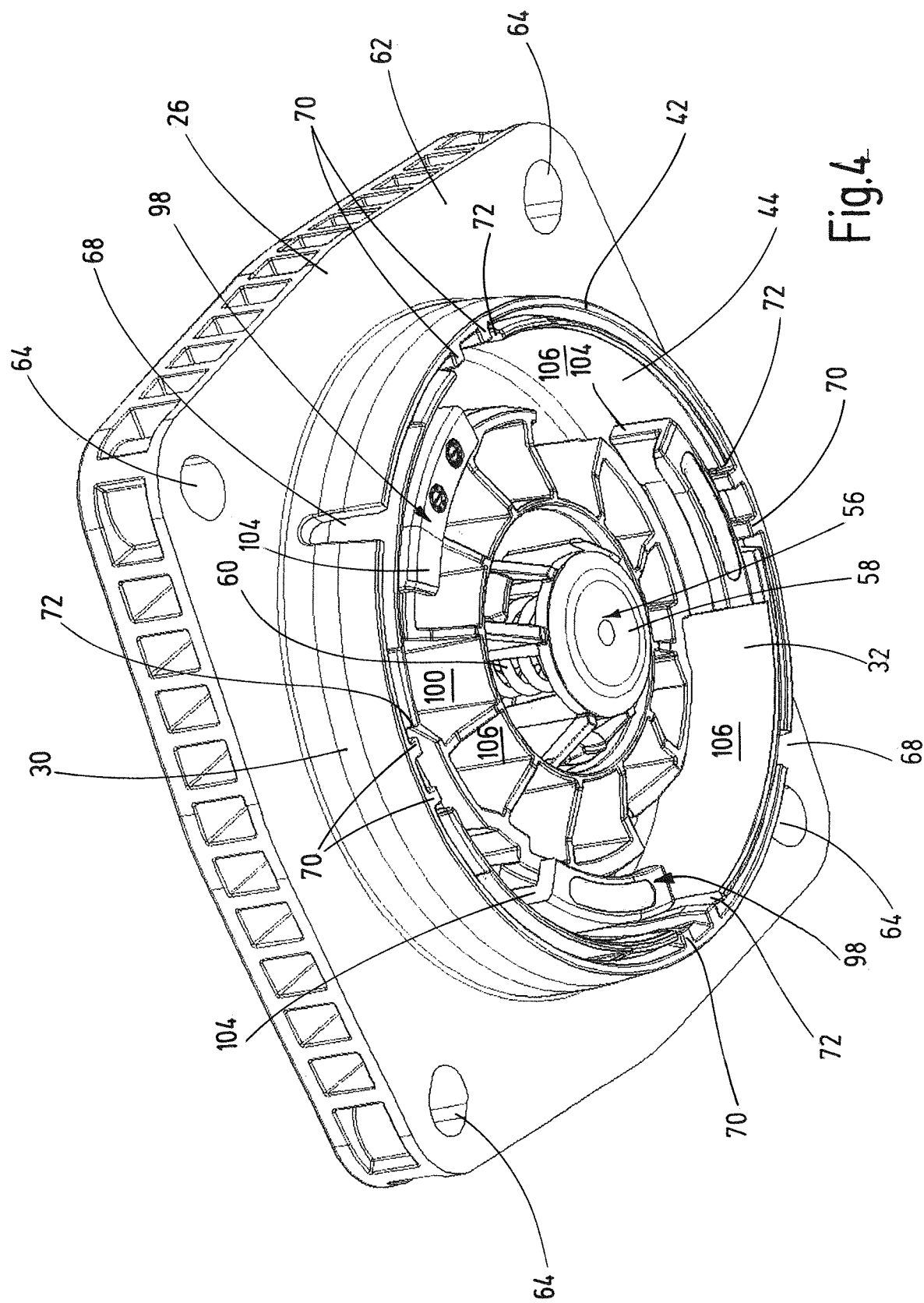
FIGS. 4 and 5 are perspective bottom views of the filter head shown in FIGS. 1 and 2 and of a filter head according to a second exemplary embodiment of the invention designed as a flanged cover with a threaded cover, respectively.
Figure 5:
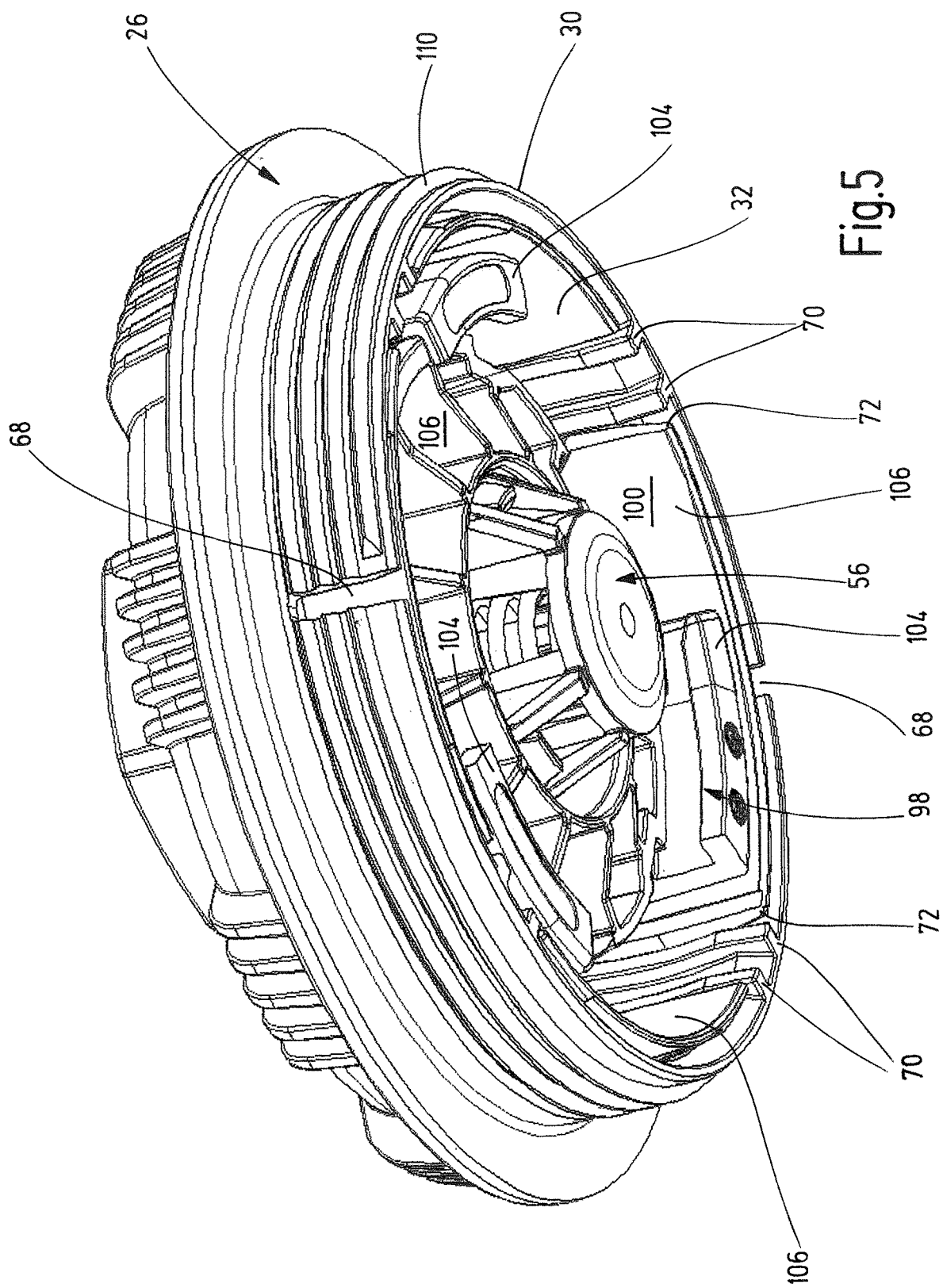

As FIGS. 4, 5 further show, the stationary head part 30 has on its inside, at four points diametrically opposite to one another with respect to the longitudinal axis 48, four projecting double bars 70, which engage as springs with assignable grooves 72, which, on the underside of the swivel shell body 44, interrupt the course of the wall of the swivel shell body 44. The double bars 70, designed as springs of a spring-groove system, engage with the respective groove 72 in a precisely fitting manner. In this way, the two shell bodies 42, 44 are secured against radial rotation by form fit in the assembled state as shown in FIG. 4.

Figure 3:
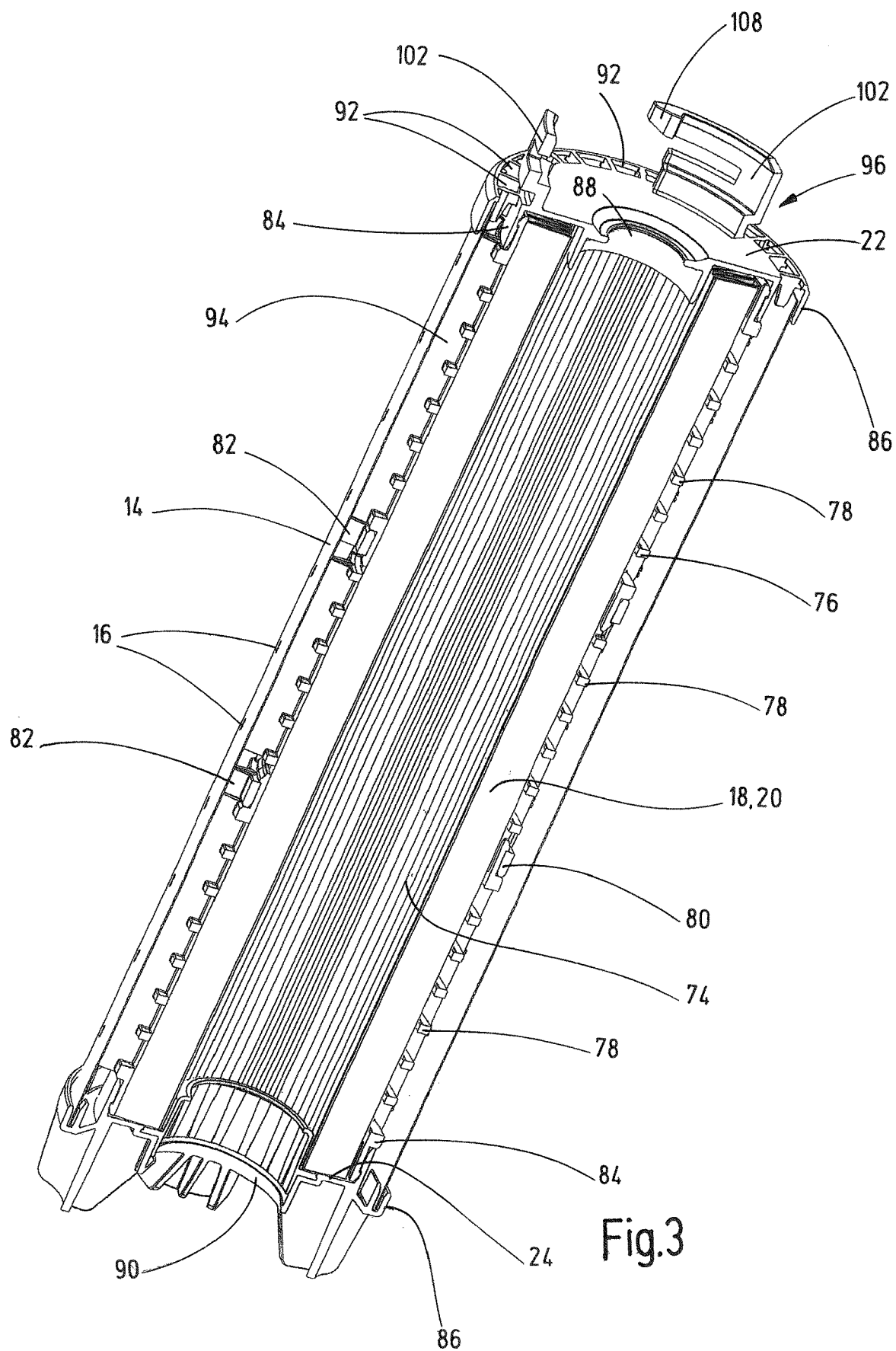
FIG. 3 is a perspective view in section of the filter housing, in which the filter element is inserted and which is connectable to the filter head in FIG. 1.

The filter housing 14 with the filter element 18, shown in particular in FIG. 3, has for the filter element 18 a pleated element material 20, which is formed in the shape of a hollow cylinder and encompasses an inner filter cavity 74 at its inside. Furthermore, a support tube 76, which is composed of individual interconnected tube segments 78, supports the filter medium or element material 20 on its outside. The support tube 76 stabilizes the element material 20 externally and is formed of a fluid-permeable grid structure for the individual tube segments 78. Clip or latching connections 80 are used to interconnect the individual tube segments 78 at their adjacent ends. The clip or latching connections 80 have radially projecting bars 82, on which the filter housing 14 or the outflow tube can be supported in a pressure-stable manner on its inside. Furthermore, the free upper end of the support tube 76 and its lower end are connected to the upper end cap 22 and to the lower end cap 24, respectively, each via a clip or latching connection 84, such that the two adjacently opposite end caps 22, 24 are held at a defined distance from each other via the support tube 76 and form a secured overall structure with each other. The two end caps 22, 24 each have a groove-shaped peripheral rim 86, into which the thin-walled filter housing 14 is inserted at the end with axial play relative to the upper end cap 22 and is likewise secured to the support tube 76 in this way. Furthermore, both the upper end cap 22 and the lower end cap 24 each have a passage in the form of passage opening 88 and 90, respectively, wherein the upper passage opening 88 is closed by the closing part 58 of the bypass valve 56 during normal filtration operation, whereas the lower passage opening 90, possibly placed on an attachment neck (not shown) in the tank, establishes the fluid-conveying connection between the filter cavity 74 and the interior of the tank 12.

Furthermore, the upper end cap 22 has individual fluid passages 92 on the circumference, which, when the bypass valve 56 is actuated and the closing part 58 is then lifted off, allow for the direct connection between the filter cavity 74 via the fluid passages 92 to the inside 94 of the filter housing 14 against the action of the compression spring 60, wherein said inside 94 forms a fluid space resulting from the radial spacing between the filter housing 14 and the support tube 76 in conjunction with the element material 20. The upper end cap 22 comprises a locating device or locator 96 that interacts with a receiving device or receiver 98 located in the interior 100 of the filter head 26, for positionally retaining the filter housing 14 and the filter element 18 in the installed functional position. The locating device 96 has three, locating bars 102, only two of which are shown in FIG. 3, and which, as viewed in the direction of FIG. 3, extend upwards away from the circular disk-shaped upper end cap 22, offset from each other by 120° in the vicinity of the peripheral rim, which delimits the encompassing space 86 outwards. In this respect, the locating device 96 is an integral part of the upper end cap 22. In an arrangement corresponding to the locating bars 102, the receiving device 98 has guide parts 104 with guideways for the locating bars 102. These guide parts 104 are preferably an integral part of the swivel head part 32 and are arranged on the inside thereof (see FIG. 2).

The process of installing a filter housing 14 is performed in stages, wherein in a first stage the upper end cap 22 is inserted into the interior 100 in an axial motion. Insertion is performed with the filter element 14 in a rotational position, in which the locating bars 102 are each aligned with a respective insertion space 106, which are free spaces (cf. FIG. 4) in the interior 100 offset from one another by 120°. The filter housing 14 is then rotated out of the installation space 106 in two further stages until a latched position is reached, wherein the individual locating bars 102 are guided by guideways along the guide parts 104 in the cover 26 during this rotational motion. The axial insertion motion and the subsequent rotational motion can take place against the spring force of the compression spring 60 of the bypass valve 56 to achieve a preload in the latched position in this way. Ultimately, in the latched position, the projection-shaped latching parts 108 arranged at the ends of the locating bars 102 in a spring-elastic manner extend beyond the respective assignable free end rim of the guide parts 104 arranged on the cover end, to then secure the filter housing 14 together with its replaceable filter element 18 on the filter head 26 in this way, both in the axial and in the radial direction. In view of the complexity of this solution, reference is made to the post-published DE 10 2019 005 323.0 with regard to the details of the structural design of the latching mechanism presented above.

The second embodiment according to FIG. 5 is only modified from the solution according to FIG. 4 in that, instead of a flange plate, this filter head 26 is designed as a threaded cover part, enabling the filter device to be secured to a third component, such as a tank wall 10, which is provided with a female thread via a flange part not shown in greater detail, wherein the female thread permits the filter head 26 according to FIG. 5 to be screwed in via its male thread 110. Otherwise, the design is identical to the solution according to FIG. 4 and the previous explanations also apply to the cover solution according to FIG. 5.

Figure 6:
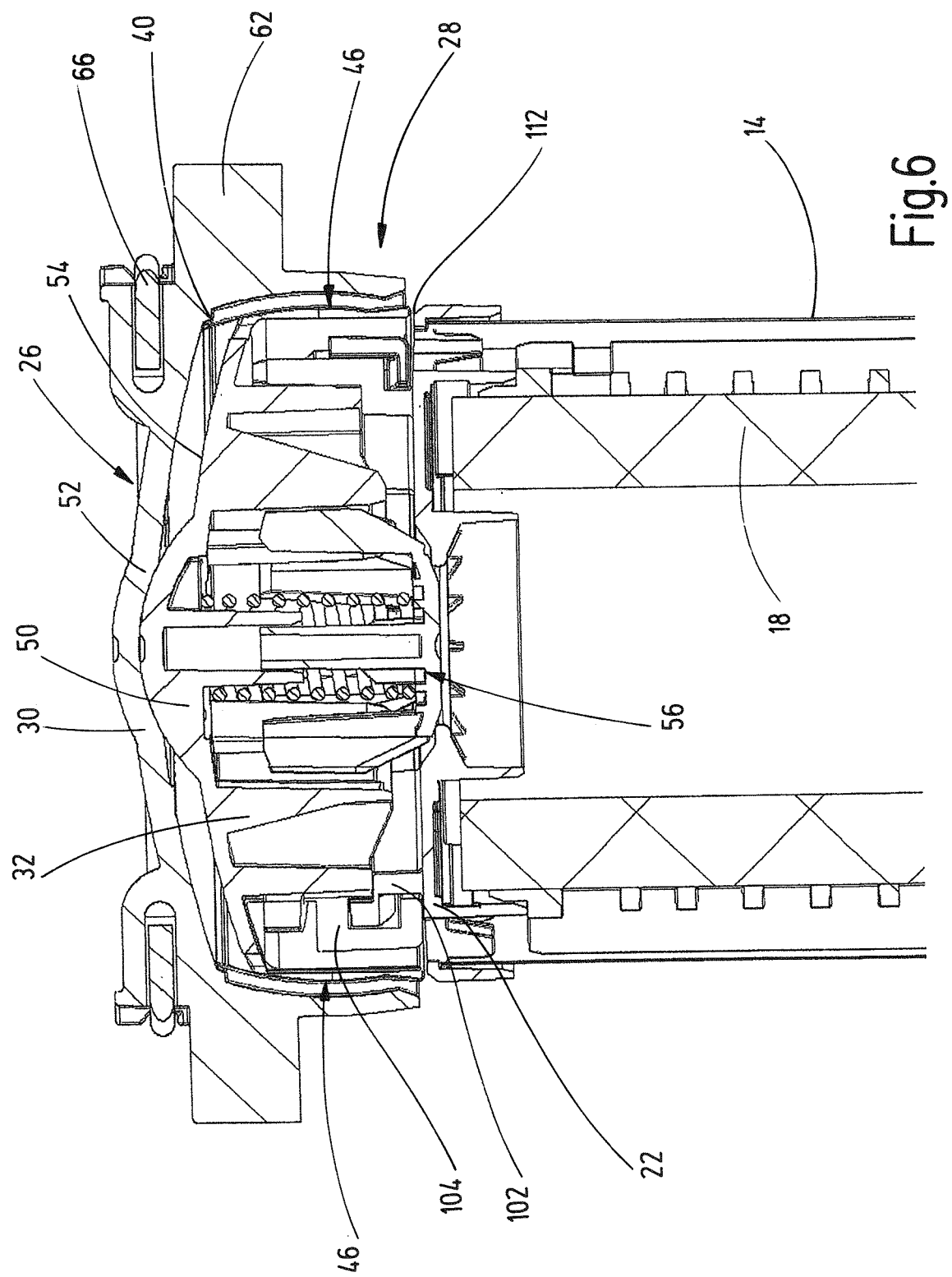
FIGS. 6 and 7 are partial side views in section of the filter device according to FIG. 1 without an angular offset and with an angular offset, respectively.
Figure 7:
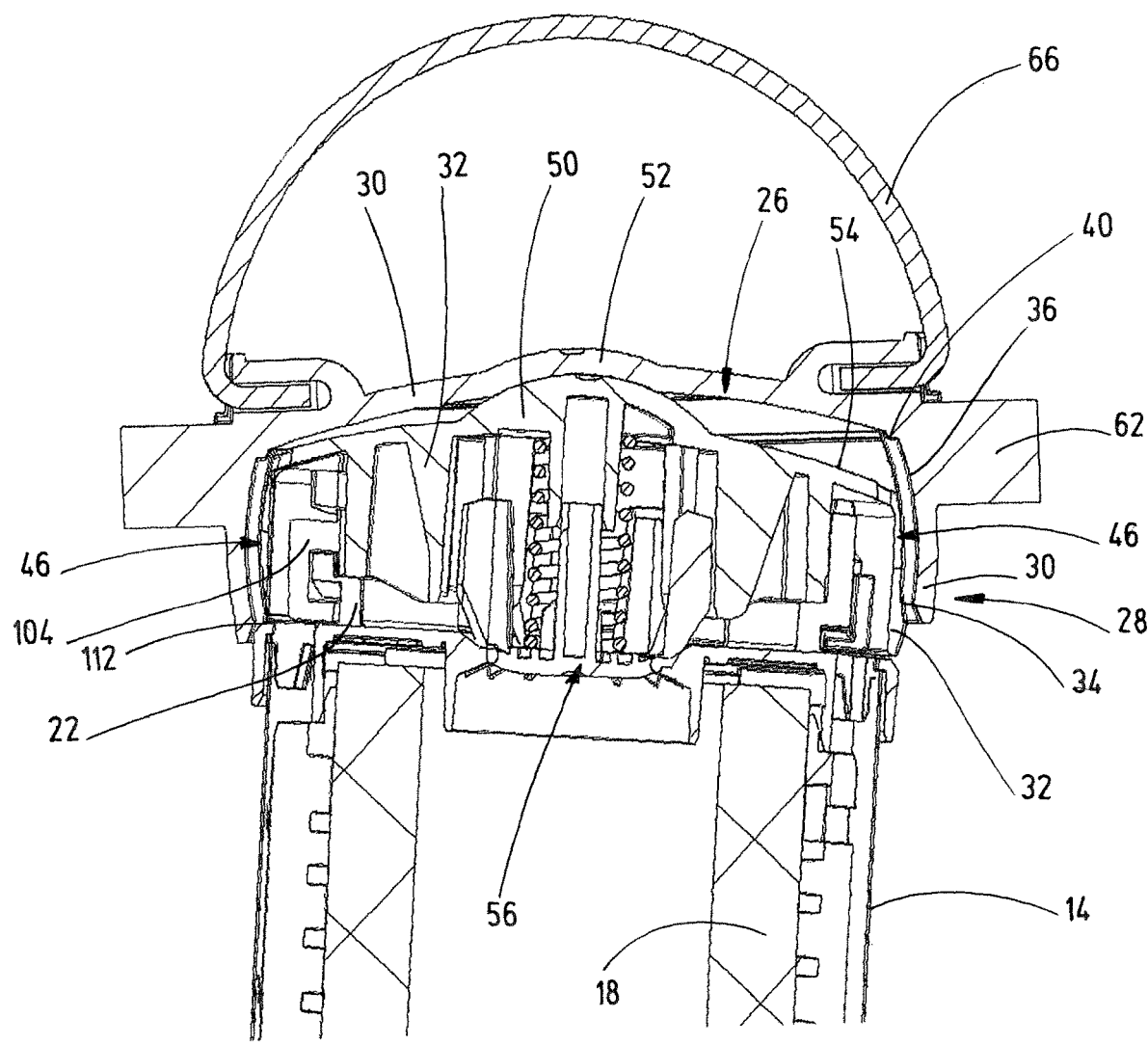

As shown in particular in FIGS. 6 and 7, which relate on the one hand to an installation situation without angular offset and on the other hand with angular offset, the filter housing 14 with filter element 18 can be held in axial alignment with the bypass valve 56 via the swivel bearing in the filter head 26, irrespective of the installation situation relating to unequal tank wall configurations, always ensuring the functionally reliable use of the filter device as a whole. The swivel mount referred to permits swivel motions in all three spatial directions, wherein, as the illustration according to FIG. 7 shows, a further swivel limitation is also formed by the lower peripheral rim 112 of the upper end cap 22, which then abuts the underside of the convex-shaped shell 42 of the stationary head part 30 in the maximum swiveling deflection. To this end, a type of swivel cone is specified for the possible swivel motions of the filter housing 14, wherein the maximum opening cone of said swivel cone is defined by the stop limit between the two head parts 30, 32 and/or between the filter housing 14 and the stationary head part 30.

While various embodiments have been chosen to illustrate the invention, it will be understood by those skilled in the art that various changes and modifications can be made therein without departing from the scope of the invention as defined in the claims.

The invention claimed is:

1. A filter device, comprising:
a filter housing;
a replaceable filter element being accommodated in the filter housing;
a filter head mounted on the filter housing and being capable of mounting the filter housing to a third component wall in an articulated manner by a bearing being in the filter head and providing more than one degree of freedom, the bearing being formed of first and second head parts of the filter head, the first head part being securable stationary to the third component wall, the second head part being swivel mounted to the first head part, being connected to the filter housing and having a convexly extending mobile bearing surface guided in a concavely extending stationary bearing surface of the first head part, the stationary bearing surface and the mobile bearing surface each being a part of stationary and swivel shells, respectively, the stationary bearing surface, viewed in an axial direction, extending over the mobile bearing surface such that during a swivel motion compensating for an angular offset about a swivel axis perpendicular to an axis of symmetry of the stationary bearing surface while the stationary and mobile bearing surfaces remain in engagement with each other; and
a stop surface on an inside of the first head part providing a circumferential limit for the swivel motion of the second head part relative to the first head part.

2. The filter device according to claim 1 wherein
the stationary bearing shell radially encompasses the swivel bearing shell; and
a lock secures the stationary and swivel shells against counter-rotation in an assembled state by a form fit.

3. The filter device according to claim 2 wherein the lock is in a form of a tongue-and-groove.

4. The filter device according to claim 1 wherein the second head part has a dome guided in a dome receiving in the first head part in a coaxial direction with respect to a longitudinal axis of the filter housing.

5. The filter device according to claim 4 wherein curvatures of the stationary and swivel shells and curvatures of the dome and dome receiving are selected such that, for an angular offset of the filter housing, the stationary and mobile bearing surfaces are in contact with each other and can slide along each other without interference.

6. The filter device according to claim 4 wherein in an extension of the dome in a direction of the filter housing, a bypass valve is in the second head part, a closing part of the bypass valve closing an opening of an adjacently arranged end cap of the filter element in an unactuated state of the bypass valve.

7. The filter device according to claim 1 wherein the filter head is formed as a flanged cover.

8. The filter device according to claim 1 wherein the filter head is formed as a threaded cover.

9. The filter device according to claim 1 wherein
the filter housing forms a structural unit with the filter element, the structural unit having a locator, which, in a basic position, is insertable axially into a mounting of the second head part; and
after a rotational motion has been performed from the basic position, the locator is latchable to the mounting in a latched position using a latch.

10. The filter device according to claim 6 wherein
the filter housing encompasses the filter element at a radial distance and comprises housing openings for passage of fluid; and
an interior of the filter element is encompassed by a filter element material and is connected to an environment via an opening at an end cap of the filter element opposite to the bypass valve in a fluid-conveying manner.

11. The filter device according to claim 10 wherein the environment is an interior of a tank.

12. The filter device according to claim 1 wherein each of the stationary and mobile bearing surfaces is a section of a sphere.

* * * * *